(12) United States Patent
Süß et al.

(10) Patent No.: US 12,552,340 B2
(45) Date of Patent: Feb. 17, 2026

(54) METHOD FOR DETECTING A SAFE STATE OF A VALVE OF A HYDRAULIC SYSTEM

(71) Applicant: Schaeffler Technologies AG & Co. KG, Herzogenaurach (DE)

(72) Inventors: Florian Süß, Weinstadt (DE); Dietmar Häckl, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/867,810

(22) PCT Filed: Apr. 26, 2023

(86) PCT No.: PCT/DE2023/100299
§ 371 (c)(1),
(2) Date: Nov. 21, 2024

(87) PCT Pub. No.: WO2023/232177
PCT Pub. Date: Dec. 7, 2023

(65) Prior Publication Data
US 2025/0333014 A1    Oct. 30, 2025

(30) Foreign Application Priority Data
May 30, 2022    (DE) .................. 10 2022 113 487.3

(51) Int. Cl.
| | | |
|---|---|---|
| *F15B 13/02* | (2006.01) | |
| *B60R 16/08* | (2006.01) | |
| *F16D 48/02* | (2006.01) | |
| *F16D 48/06* | (2006.01) | |
| *F16H 63/48* | (2006.01) | |
| *F16K 37/00* | (2006.01) | |

(52) U.S. Cl.
CPC .............. *B60R 16/08* (2013.01); *F15B 13/02* (2013.01); *F16D 48/02* (2013.01); *F16D 48/066* (2013.01); *F16H 63/483* (2013.01); *F16K 37/0066* (2013.01); *F16D 2048/0293* (2013.01); *F16D 2500/5108* (2013.01)

(58) Field of Classification Search
CPC ....................... F16H 63/483; F16H 2048/0293
See application file for complete search history.

(56) References Cited

U.S. PATENT DOCUMENTS

| | | | | |
|---|---|---|---|---|
| 7,620,522 | B2 * | 11/2009 | Bredau | F15B 19/005 73/1.72 |
| 10,138,995 | B2 * | 11/2018 | Herkommer | F16H 61/0031 |

(Continued)

FOREIGN PATENT DOCUMENTS

| | | |
|---|---|---|
| DE | 102010008680 A1 | 8/2011 |
| DE | 102016006317 A1 | 2/2017 |
| DE | 102016213318 A1 | 1/2018 |

(Continued)

*Primary Examiner* — Thomas E Lazo
(74) *Attorney, Agent, or Firm* — Suiter Swantz IP

(57) ABSTRACT

A method for detecting a safe state of a switchable valve of a hydraulic system of an actuator in a motor vehicle includes the at least one first switchable valve, which is actuated by being energized, a pump, and a controller which controls at least the first switchable valve and the pump. The pump delivers the fluid to a first load in a first rotational direction and to at least one second load in a second rotational direction.

17 Claims, 3 Drawing Sheets

(56) References Cited

U.S. PATENT DOCUMENTS

| | | | | |
|---|---|---|---|---|
| 10,753,410 B2 * | 8/2020 | Grethel | ............... | F16D 48/0206 |
| 2022/0065273 A1 * | 3/2022 | Grethel | ................ | F15B 19/005 |

FOREIGN PATENT DOCUMENTS

| | | | | |
|---|---|---|---|---|
| DE | 102018112663 A1 | 11/2019 | | |
| DE | 102018112665 A1 | 11/2019 | | |
| DE | 102018114789 A1 | 12/2019 | | |
| DE | 102018130700 A1 * | 6/2020 | ............ | F15B 21/005 |
| DE | 102019101957 A1 * | 7/2020 | ............. | F16D 48/06 |
| DE | 102019123965 A1 | 3/2021 | | |
| DE | 102021110970 A1 | 11/2022 | | |
| DE | 102022119954 A1 | 5/2023 | | |
| DE | 102022103384 A1 | 8/2023 | | |
| DE | 102022108693 B3 | 10/2023 | | |
| WO | 2012113368 A2 | 8/2012 | | |
| WO | 2023088513 A1 | 5/2023 | | |

\* cited by examiner

METHOD FOR DETECTING A SAFE STATE OF A VALVE OF A HYDRAULIC SYSTEM

CROSS-REFERENCE TO RELATED APPLICATIONS

This application is the U.S. National Phase of PCT Appln. No. PCT/DE2023/100299 filed Apr. 26, 2023, which claims priority to DE 10 2022 113 487.3 filed May 30, 2022, the entire disclosures of which are incorporated by reference herein.

TECHNICAL FIELD

The disclosure relates to a method having the features described herein.

BACKGROUND

Hydraulic systems of this type are provided in a drive train, in particular in a hybrid drive train of a motor vehicle. For example, an internal combustion engine and an electric motor can be connected in a hybrid drive train, wherein the internal combustion engine and electric motor are directly connected by means of a separating clutch, such as a friction clutch, or can be operated independently of one another. For example, a transmission with a single transmission stage, in which a second electric motor can be arranged, is effectively arranged downstream of the electric motor between its rotor and a differential with the drive wheels.

In order to form a parking brake, for example, the motor vehicle contains a parking lock that is actuated by means of a parking pawl that engages in a transmission profile in a form-fitting manner.

In this regard, the hydraulic system is used to cool the electric motor and any other transmission components and to actuate the separating clutch and parking lock. In this regard, a pump operated electrically by an electric motor, for example a reversing pump, is used to draw in and distribute fluid. In one rotational direction of the pump, the fluid is pumped through a cooling circuit, while in the other rotational direction, the pressure required for actuation of the separating clutch or parking lock is generated. The fluid circuit is controlled by means of switchable valves such as 2-way valves and shut-off valves. In hybrid driving operation, the separating clutch is fully engaged in order to transfer the torque of the internal combustion engine to the drive wheels. The working pressure for actuating a slave cylinder in order to engage the separating clutch can be maintained by means of a switchable shut-off valve and/or a check valve.

From the prior art, hydraulic systems with an electrically driven so-called reversing pump are known. In this regard, one rotational direction of the reversing pump can be assigned a volume flow function, such as a cooling function, and the other rotational direction of the reversing pump can be assigned an actuating function. Such hydraulic systems and methods for their operation are known, for example, from the publications DE 10 2018 112 663 A1, DE 10 2018 112 665 A1, DE 10 2018 113 316 A1 and DE 10 2018 114 789 A1. Other hydraulic systems are known from the publications DE 10 2016 213 318 A1 and WO 2012/113 368 A1, among others.

In order to ensure the safe function of a hydraulic actuator—as shown in FIG. 1—it must be diagnosed that the so-called switching valve (a control valve) (designated with reference sign 21 in FIG. 1) in the hydraulic system of the actuator has fallen back to the initial state, i.e., the non-actuated state—hereinafter always referred to as the safe state—after an actuation. This can prevent the undesired actuation of safety-critical components, such as an undesired disengagement of a parking lock (FIG. 1, reference sign 7).

Position sensors on valves are not economically feasible. Moreover, in the underlying hydraulic actuator (FIG. 1), an undesired engagement or disengagement of the parking lock cannot be detected in a timely manner by means of a position sensor on the parking lock. This means that only indirect signals are available for diagnosing the valve position.

In the present hydraulic actuator—as shown in FIG. 1—valves, for example valve 21 and valve 24 in FIG. 1, are actuated by actively applying a current. A return to the rest position is achieved passively by reducing the current and by forces applied by an installed spring. In this regard, it cannot be ruled out that the valve will jam, i.e., that the rest position will not be reached. If multiple consumers are controlled via the same actuation path, jamming of the valve would result in the desired function, such as actuating the clutch (FIG. 1, reference sign 8), not being possible, but instead an undesired function, such as disengaging the parking lock (FIG. 1, reference sign 7), being executed. This problem therefore arises in particular when the actuation of multiple consumers in the same path is controlled by a single common valve, as shown in FIG. 1, for example: The clutch 8 and parking lock 7 are each activated by the common 4/2-way valve 21.

In particular, the valve 21 but also the valve 24 in FIG. 1 are addressed with such required diagnostic methods. Until now, it was not possible to detect such an undesired function in a timely manner and prevent a safety-critical error. A diagnostic method for detecting the safe state of a valve in the hydraulic system of the actuator is therefore to be proposed.

SUMMARY

The object of the disclosure is therefore to ensure that the valve returns to its rest position or a predetermined safe state after actuation.

The object is achieved by a method having the features described herein.

According to the disclosure, the object is thus achieved by a method for detecting a safe state of a switchable valve of a hydraulic system of an actuator in a motor vehicle having at least the one first switchable valve which is actuated by being energized, a pump and a controller which controls at least the first switchable valve and the pump. It is provided that the pump delivers fluid to a first consumer in a first rotational direction and delivers fluid to at least one second consumer in a second rotational direction, and has a line system through which the pump can be connected to the at least one second consumer with the first switchable valve being interposed, wherein the line system has a hydraulic pressure line connected to the pump and a first pressure line branch actuating a parking lock and a second pressure line branch actuating a friction clutch, wherein the two pressure line branches can be alternately connected to the hydraulic pressure line by means of the first switchable valve, wherein a pressure sensor connected to the controller is mounted in the pressure line branch actuating the friction clutch, characterized in that the energization of the first switchable valve is deactivated by the controller and the pump is activated with an increasing speed ramp in the second rotational direction, and in that the safe state of the first switchable valve is detected when the pressure difference at the pressure sensor since the start of the speed ramp reaches a predetermined limit value Δp within a predetermined time period Δt since the start of the speed ramp.

In a preferred embodiment, a second switchable valve controlled by the controller and actuated by being energized is introduced into the pressure line branch actuating the friction clutch (8), by means of which the pressure line branch actuating the friction clutch can be alternately connected to a reservoir via a discharge line, wherein the safe state of the first switchable valve is detected and the pump is deactivated and the safe state of the second switchable valve is detected when the pressure difference at the pressure sensor falls back to the value from before the start of the speed ramp.

In a further preferred embodiment, the pump is activated from standstill with the increasing speed ramp in the second rotational direction.

In a particularly preferred embodiment, the first switchable valve is a 4/2 valve and the second switchable valve is a 2/2 valve.

According to the disclosure, the object is also achieved by a device for detecting a safe state of a switchable valve of a hydraulic system of an actuator in a motor vehicle having at least the one first switchable valve which is actuated by being energized, a pump and a controller which controls at least the first switchable valve and the pump. It is provided that the pump delivers fluid to a first consumer in a first rotational direction and delivers fluid to at least one second consumer in a second rotational direction, and has a line system through which the pump can be connected to the at least one second consumer with the first switchable valve being interposed, wherein the line system has a hydraulic pressure line connected to the pump and a first pressure line branch actuating a parking lock and a second pressure line branch actuating a friction clutch, wherein the two pressure line branches can be alternately connected to the hydraulic pressure line by means of the first switchable valve, wherein a pressure sensor connected to the controller is mounted in the pressure line branch actuating the friction clutch, and wherein a second switchable valve controlled by the controller and actuated by being energized is introduced into the pressure line branch actuating the friction clutch, by means of which the pressure line branch actuating the friction clutch can be alternately connected to a reservoir via a discharge line, characterized in that the device carries out one of the methods described above.

In this way, the safe function of such a hydraulic actuator can advantageously be greatly improved.

BRIEF DESCRIPTION OF THE DRAWINGS

The disclosure is explained in more detail with reference to the exemplary embodiment shown in FIGS. 1 and 2. In the figures.

Left: Valve 21 is OK (valve is in safe state)

Right: Valve 21 is not OK (safe state of the valve 21 not confirmed)

Figure 1:
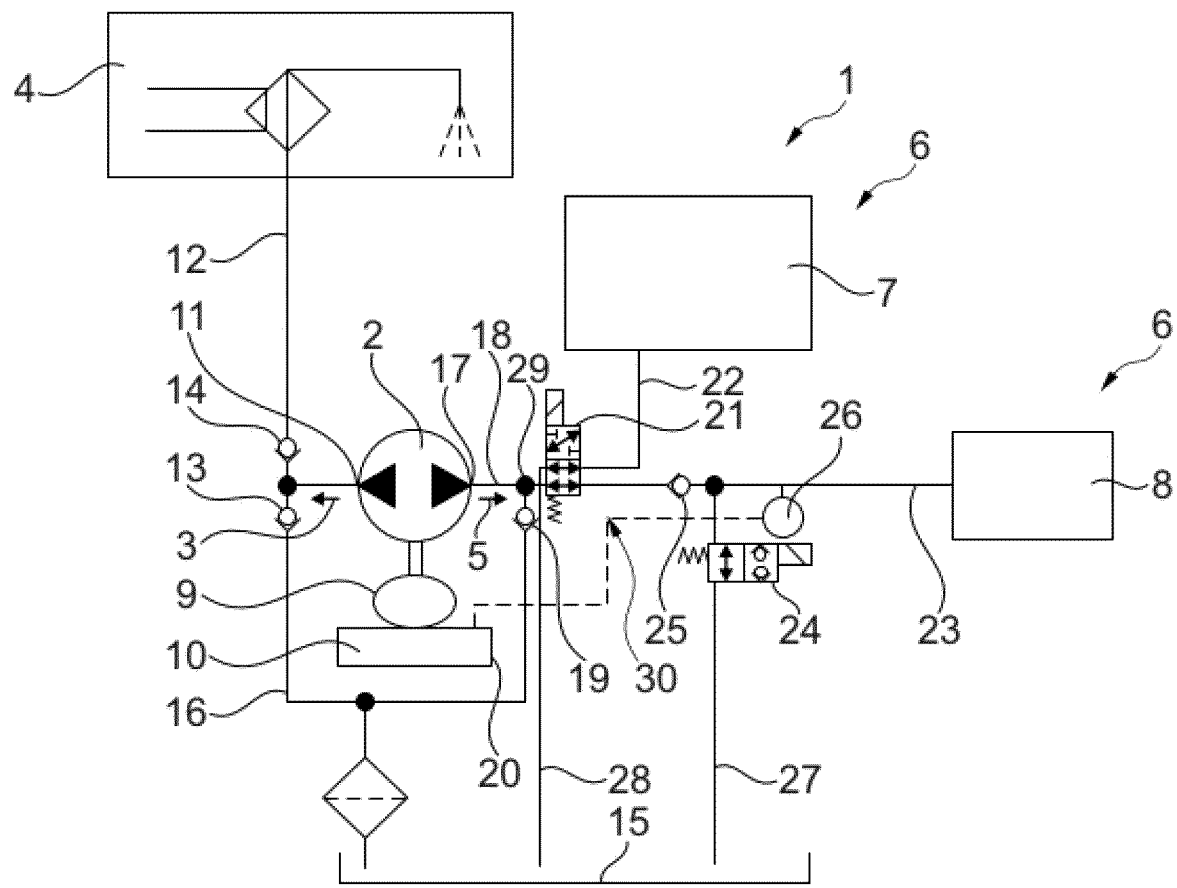
FIG. 1 shows a hydraulic diagram of a hydraulic system
Figure 3:
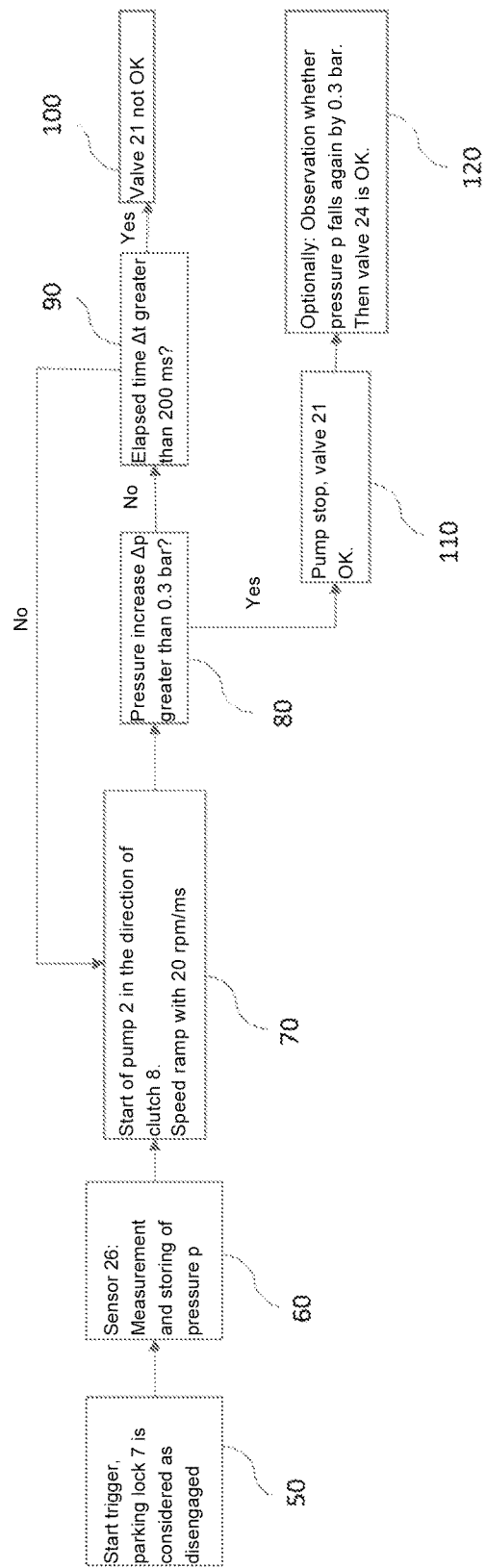

FIG. 3 shows a flow diagram of the method according to the disclosure for detecting the safe state of the valve 21 and/or the valve 24 in the hydraulic system of FIG. 1.

DETAILED DESCRIPTION

FIG. 1 shows a schematic representation of the hydraulic system 1 of the actuator. The hydraulic system 1 has a pump 2 designed as a reversing pump. The pump 2 can be driven in a first rotational direction 3. In the first rotational direction 3, the pump 2 delivers fluid to the first consumer 4, such as a cooling device, and provides a volume flow function.

The pump 2 can be driven in a second rotational direction 5 opposite to the first rotational direction 3. In the second rotational direction 5, the pump 2 delivers the fluid to the two consumers 6. In this regard, an operating pressure is built up in order to actuate them. In the exemplary embodiment shown, the pump 2 delivers the fluid to two second consumers 6, in this case to a slave cylinder of the parking lock 7 and to a slave cylinder of the friction clutch 8.

The pump 2 is driven by the electric motor 9. The electric motor 9 is controlled by the controller 10. The first pump inlet 11 of the pump 2 is connected to the first consumer 4 by means of the cooling line 12 with the check valve 14 being interposed and to the first intake branch 16 drawing in from the reservoir 15 by means of the check valve 13. The check valve 13 prevents the fluid from being pumped back into the reservoir 15.

The opposite pump inlet 17 of pump 2 is connected to the intake branch 20 with the check valve 19 being interposed. The pump inlet 17 is also connected to the line system 30, which contains the hydraulic pressure line 18, the pressure line branches 22, 23, the valves 21, 24, the check valve 25 and the discharge lines 27, 28. The pressure line branches 22, 23 are followed by the consumers 6, which are each actuated, for example, by means of a slave cylinder, not shown, connected to one of the pressure line branches 22, 23. Depending on the rotational directions 3, 5, the pump 2 draws in fluid from the reservoir 15 from one of the intake branches 16, 20 in each case.

The hydraulic pressure line 18 can be alternately connected to the pressure line branch 22 supplying the slave cylinder of the parking lock 7 or the pressure line branch 23 supplying the slave cylinder of the friction clutch 8 by means of the switchable valve 21, in this case a 4/2 valve. The switchable valve 24, in this case a 2/2 valve, is introduced into the pressure line branch 23 and connects it to the reservoir 15 via the discharge line 27. With the valve 21 connected between the hydraulic pressure line 18 and the pressure line branch 23, the pressure line branch 22 is connected to the reservoir 15 by means of the discharge line 28, so that the parking lock 7 is disengaged. With the hydraulic pressure line 18 connected to the pressure line branch 22, the pressure line branch 23 is decoupled. A pressure built up at the slave cylinder of the friction clutch in order to actuate the friction clutch 8 is maintained by means of the check valve 25, so that the friction clutch 8 remains engaged, for example, regardless of the energization of the valve 21 or the operation of the pump 2, and only the pressure loss due to leakage has to be compensated for. The friction clutch 8 is disengaged by opening the valve 24.

The pressure sensor 26 connected to the controller 10 is connected to the pressure line branch 23.

Figure 2:
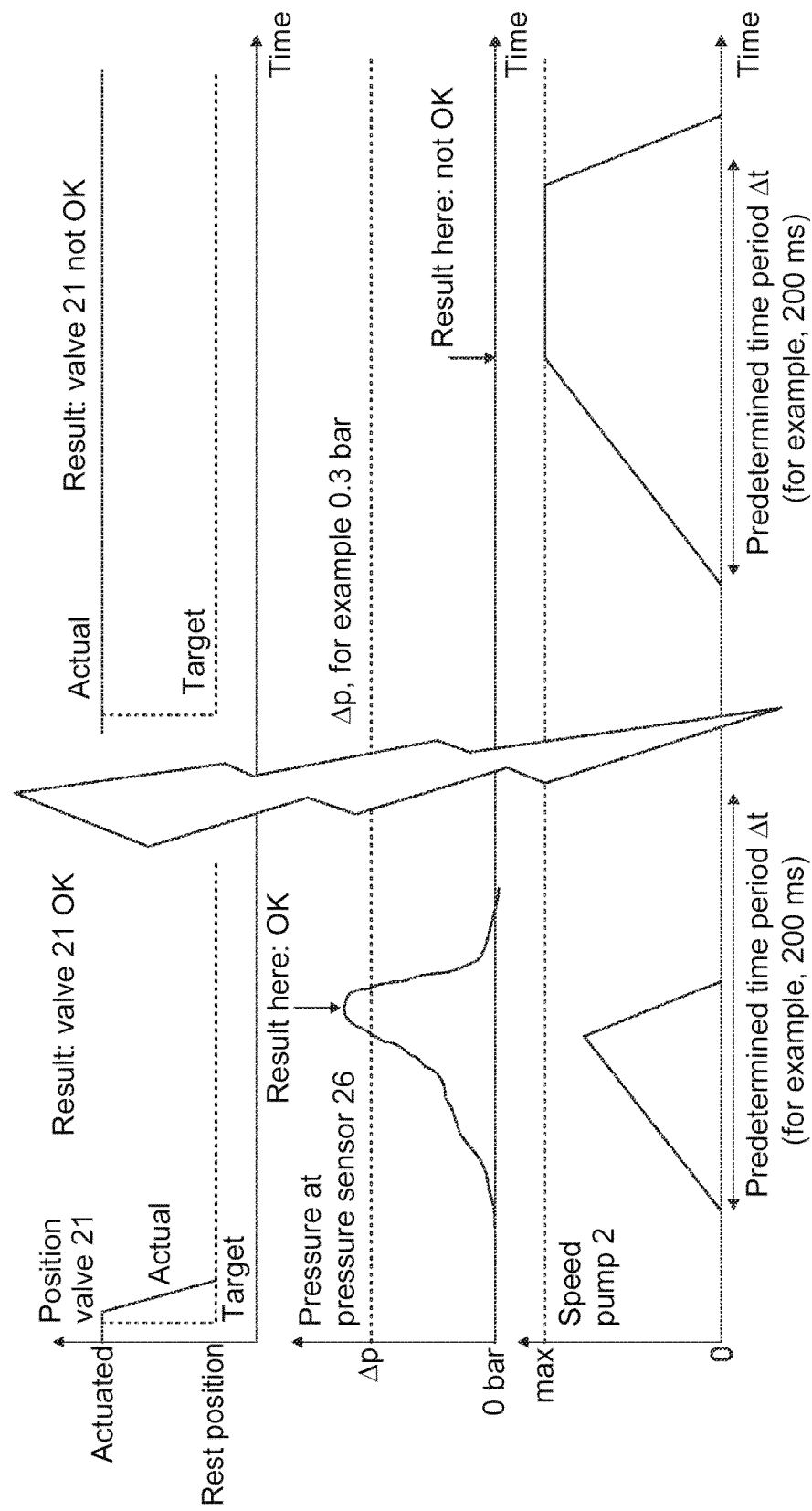
FIG. 2 shows a schematic representation of the method according to the disclosure for detecting the safe state of the valve 21 in the hydraulic system of FIG. 1.

FIG. 2 shows the basic sequence of the method according to the disclosure. It is assumed, in this regard, that the valve 24 is switched to the open position.

FIG. 2, right (top) shows the case in which the valve 21 does not fall back from the actuated state (connection to the parking lock) to the rest state, for example because the valve 21 is jammed, although the valve 21 is intended to fall back to the rest state in accordance with step 50 (FIG. 3).

FIG. 2, left (top) shows the case in which the valve 21 falls back from the actuated state to the rest state, as intended in accordance with step 50 (FIG. 3).

In both cases, the pump 2 is now operated in the direction of the pump inlet 17, i.e., in the direction of reference sign 5, with an increasing speed ramp of, for example, 20 rpm/ms (cf. step 70 in FIG. 3) (FIG. 2, bottom).

According to FIG. 2, right (center), the pressure at the pressure sensor 26 does not increase, as there is no hydraulic connection to this pressure line branch 23 due to the jammed valve 21.

According to FIG. 2, right (bottom), the pump reaches its maximum speed with the speed ramp and stops after the predetermined time period Δt of 200 ms, for example, has elapsed (cf. step 80 in FIG. 3).

According to FIG. 2, left (center), the pressure at pressure sensor 26 increases up to a predetermined pressure difference Δp compared to the pressure before the start of the speed ramp of the pump 2, which is determined in step 60, since the valve 21 is not jammed and has fallen back to the safe state.

According to FIG. 2, left (bottom), the pump does not reach its maximum speed at all with the speed ramp and stops when the predetermined pressure difference of, for example, 0.3 bar is reached (cf. step 80 in FIG. 3).

FIG. 3 shows the entire sequence of the method with exemplary values. This also includes the optional detection of the discharge valve 24.

A routine for execution after a valve actuation of the valve 21 is disclosed, which checks whether the valve is back in the rest position. If not, preventive replacement reactions are possible in order to prevent the activation of undesired, safety-critical functions in the vehicle.

In the rest position, the valve 21 is in the clutch 8 position, as shown in FIG. 1. The valve 21 thus connects the hydraulic pressure line 18 and the pressure line branch 23. The valve 21 is therefore not in the alternative parking lock 7 position. The pressure sensor 26 present in the pressure line branch 23 is used to detect this valve position of the valve 21. Due to the characteristics of the present hydraulic system, it is possible to build up a dynamic pressure p at the pressure sensor 26, as there is a fluid flow from the pump 2 to the tank 15 when the discharge valve 24 is open, but this does not actuate the clutch 8. In this regard, the following requirements exist with regard to the method: The pressure p must exceed a predetermined value that is greater than the sensor accuracy of the pressure sensor 26 in order to have a meaningful result. On the other hand, however, the pressure p must not become too high in order to ensure that no leakage towards the clutch 8 or even an undesired clutch actuation occurs. In addition, only a certain amount of time is available for the entire method. The method should be carried out after each actuation (disengagement of parking lock 7) and subsequent actual falling back of the valve 21 as shown in FIG. 2 on the left, or as shown in FIG. 2 on the right, in the event that a falling back of the valve 21 was intended but has not actually occurred due to a fault or damage to be detected by means of the method according to the disclosure (FIG. 3, step 50). The speed of the hydraulic pump 2 should then be increased in the form of a ramp (FIG. 3, step 70) and the pressure p in the clutch pressure line branch 23 be monitored by the pressure sensor 26 (FIG. 3, step 60). If the pressure increases by a predetermined pressure difference Δp (FIG. 3, step 80) within a predetermined time period Δt (FIG. 3, step 90), the method evaluates the falling back of the valve 21 into the safe state as successful (FIG. 3, step 120). Otherwise, the falling back of the valve 21 into the safe state is evaluated as having failed (FIG. 3, step 100) and a replacement reaction must be carried out in order to prevent any further damage. This replacement reaction is defined on a project-specific basis.

For the exemplary case described here, a reduced functionality would be conceivable, while the parking lock 7 is disengaged with all functions switched off as soon as the parking lock 7 is engaged. The system can then only be actuated again if replacement reactions are available on the vehicle side and are actually present. (A brake application by the driver, for example).

The use of a speed ramp offers the advantage of optimized detection. The goal in this regard is to optimize the time and reduce noise from the actuator as much as possible. Depending on the system and temperature, the speed at which a predetermined pressure is exceeded also varies. This therefore no longer needs to be taken into account. In addition, the speed ramp significantly reduces the probability of exceeding the upper limit for the permitted pressure p.

In practice, it has been shown that it is possible to detect the pressure increase for all relevant system temperatures. In addition, the time criterion was also met in all tests.

It is also possible to diagnose the position of the other switching valve 24 as part of the method according to the disclosure. This either allows a volume flow from the clutch into the tank (rest position) or blocks it so that pressure can build up. The method step now consists of continuing to monitor the pressure: If the pressure is not reduced after the pump has stopped (FIG. 3, step 110), this valve 24 is then not in the rest position (FIG. 3, step 120).

LIST OF REFERENCE SIGNS

1 Hydraulic system
2 Pump
3 Rotational direction
4 Consumer
5 Rotational direction
6 Consumer
7 Parking lock
8 Friction clutch
9 Electric motor
10 Controller
11 Pump inlet
12 Cooling line
13 Check valve
14 Check valve
15 Reservoir
16 Intake branch
17 Pump inlet
18 Hydraulic pressure line
19 Check valve
20 Intake branch
21 Valve
22 Pressure line branch
23 Pressure line branch
24 Valve
25 Check valve
26 Pressure sensor
27 Discharge line
28 Discharge line
29 Connection node
30 Line system
50 Method step
60 Method step
70 Method step
80 Method step
90 Method step
100 Method step 110 Method step
120 Method step

The invention claimed is:

1. A method for detecting a safe state of a switchable valve of a hydraulic system of an actuator in a motor vehicle, the method comprising:
    delivering fluid, via a pump, to a first consumer in a first rotational direction and delivering fluid, via the pump, to at least one second consumer in a second rotational direction, the hydraulic system having at least a first switchable valve which is actuated by being energized, the pump, and a controller which controls at least the first switchable valve and the pump, the hydraulic system having a line system through which the pump is configured to be connected to the at least one second consumer with the first switchable valve being interposed, wherein the line system has a hydraulic pressure line connected to the pump, a first pressure line branch actuating a parking lock, and a second pressure line branch actuating a friction clutch, wherein the first pressure line branch and the second pressure line branch are configured to be alternately connected to the hydraulic pressure line by of the first switchable valve, wherein a pressure sensor connected to the controller is mounted in the second pressure line branch, wherein energization of the first switchable valve is deactivated by the controller and the pump is activated with an increasing speed ramp in the second rotational direction, wherein the safe state of the first switchable valve is detected when a pressure difference at the pressure sensor since a start of the increasing speed ramp reaches a predetermined limit value within a predetermined time period since the start of the increasing speed ramp.

2. The method according to claim 1, wherein a second switchable valve controlled by the controller and actuated by being energized is introduced into the second pressure line branch, wherein introducing the second switchable valve into the second pressure line branch causes the second pressure line branch to be alternately connected to a reservoir via a discharge line, wherein the safe state of the first switchable valve is detected and the pump is deactivated and the safe state of the second switchable valve is detected when the pressure difference at the pressure sensor falls back to a value from before the start of the increasing speed ramp.

3. The method according to claim 1, wherein the pump is activated from standstill with the increasing speed ramp in the second rotational direction.

4. The method according to claim 2, wherein the first switchable valve is a 4/2 valve and the second switchable valve is a 2/2 valve.

5. A device for detecting a safe state of a switchable valve of a hydraulic system of an actuator in a motor vehicle comprising:
    a first switchable valve which is actuated by being energized;
    a pump;
    a controller which controls at least the first switchable valve and the pump, wherein the pump delivers fluid to a first consumer in a first rotational direction and delivers fluid to at least one second consumer in a second rotational direction;
    a line system through which the pump is configured to be connected to the at least one second consumer with the first switchable valve being interposed, wherein the line system has a hydraulic pressure line connected to the pump, a first pressure line branch actuating a parking lock, and a second pressure line branch actuating a friction clutch, wherein the first pressure line branch and the second pressure line branch are configured to be alternately connected to the hydraulic pressure line by the first switchable valve;
    a pressure sensor connected to the controller and mounted in the second pressure line branch, wherein energization of the first switchable valve is deactivated by the controller and the pump is activated with an increasing speed ramp in the second rotational direction, wherein the safe state of the first switchable valve is detected when a pressure difference at the pressure sensor since a start of the increasing speed ramp reaches a predetermined limit value within a predetermined time period since the start of the increasing speed ramp; and
    a second switchable valve controlled by the controller and actuated by being energized is introduced into the second pressure line branch, wherein introducing the second switchable valve into the second pressure line branch causes the second pressure line branch to be alternately connected to a reservoir via a discharge line.

6. The device according to claim 5, wherein the safe state of the first switchable valve is detected and the pump is deactivated and the safe state of the second switchable valve is detected when the pressure difference at the pressure sensor falls back to a value from before the start of the increasing speed ramp.

7. The device according to claim 5, wherein the pump is activated from standstill with the increasing speed ramp in the second rotational direction.

8. The device according to claim 7, wherein the first switchable valve is a 4/2 valve and the second switchable valve is a 2/2 valve.

9. A hydraulic system comprising:
    a first switchable valve which is actuated by being energized;
    a pump;
    a first consumer;
    at least one second consumer comprising a parking lock and a friction clutch;
    a controller which controls at least the first switchable valve and the pump, wherein the pump delivers fluid to the first consumer in a first rotational direction and delivers fluid to the at least one second consumer in a second rotational direction;
    a line system through which the pump is configured to be connected to the at least one second consumer with the first switchable valve being interposed, wherein the line system has a hydraulic pressure line connected to the pump, a first pressure line branch actuating the parking lock, and a second pressure line branch actuating the friction clutch, wherein the first pressure line branch and the second pressure line branch are configured to be alternately connected to the hydraulic pressure line by the first switchable valve;
    a pressure sensor connected to the controller and mounted in the second pressure line branch, wherein energization of the first switchable valve is deactivated by the controller and the pump is activated with an increasing speed ramp in the second rotational direction, wherein a safe state of the first switchable valve is detected when a pressure difference at the pressure sensor since a start of the increasing speed ramp reaches a predetermined limit value within a predetermined time period since the start of the increasing speed ramp; and
    a second switchable valve controlled by the controller and actuated by being energized is introduced into the second pressure line branch, wherein introducing the second switchable valve into the second pressure line branch causes the second pressure line branch to be alternately connected to a reservoir via a discharge line.

10. The hydraulic system according to claim 9, wherein the safe state of the first switchable valve is detected and the pump is deactivated and the safe state of the second switchable valve is detected when the pressure difference at the pressure sensor falls back to a value from before the start of the increasing speed ramp.

11. The hydraulic system according to claim 9, wherein the pump is activated from standstill with the increasing speed ramp in the second rotational direction.

12. The hydraulic system according to claim 11, wherein the first switchable valve is a 4/2 valve and the second switchable valve is a 2/2 valve.

13. The hydraulic system according to claim 9, comprising an electric motor, wherein the pump is driven by the electric motor controlled by the controller.

14. The hydraulic system according to claim 9, wherein the first consumer is a cooling device, wherein a first pump inlet of the pump is connected to the first consumer by a cooling line with a first check valve being interposed, wherein the first pump inlet is connected to a first intake branch drawing in from the reservoir by a second check valve.

15. The hydraulic system according to claim 14, wherein a second pump inlet of the pump is connected to a second intake branch drawing in from the reservoir by a third check valve, wherein the second pump inlet is connected to the line system.

16. The hydraulic system according to claim 9, wherein the discharge line is a second discharge line, wherein the line system comprises a first discharge line, wherein, with the first switchable valve connected between the hydraulic pressure line and the second pressure line branch, the first switchable valve connects the first pressure line branch to the reservoir by the first discharge line such that the parking lock is disengaged.

17. The hydraulic system according to claim 9, wherein the second switchable valve is open causing the second pressure line branch to be connected to the reservoir via the discharge line when detecting the safe state of the first switchable valve.

\* \* \* \* \*